United States Patent
Stickney et al.

(10) Patent No.: US 9,896,347 B2
(45) Date of Patent: Feb. 20, 2018

(54) DYNAMIC FLUID PASTEURIZATION

(71) Applicant: SolarLogic, LLC, Santa Fe, NM (US)

(72) Inventors: Bristol Stickney, Tesuque, NM (US);
Fredric Milder, Galisteo, NM (US)

(73) Assignee: SolarLogic, LLC, Santa Fe, NM (US)

( * ) Notice: Subject to any disclaimer, the term of this patent is extended or adjusted under 35 U.S.C. 154(b) by 564 days.

(21) Appl. No.: 14/532,428

(22) Filed: Nov. 4, 2014

(65) Prior Publication Data
US 2015/0122745 A1    May 7, 2015

Related U.S. Application Data

(60) Provisional application No. 61/899,677, filed on Nov. 4, 2013.

(51) Int. Cl.
*F16K 11/00* (2006.01)
*B01D 35/18* (2006.01)
(Continued)

(52) U.S. Cl.
CPC .............. *C02F 1/008* (2013.01); *C02F 1/02* (2013.01); *F24D 17/0073* (2013.01); *F24D 19/1051* (2013.01); *G05D 23/1931* (2013.01); *C02F 2209/005* (2013.01); *C02F 2209/02* (2013.01); *C02F 2209/40* (2013.01); *C02F 2209/44* (2013.01); *C02F 2303/04* (2013.01);
(Continued)

(58) Field of Classification Search
CPC ................................ A61L 2/00; B09B 3/0075
USPC ................... 422/307; 137/238, 334, 624.11; 210/138, 141, 143, 175
See application file for complete search history.

(56) References Cited

U.S. PATENT DOCUMENTS

2012/0266864 A1\* 10/2012 Wright .................... C02F 1/02
                                                                    126/585

FOREIGN PATENT DOCUMENTS

AU    2010203312 A1    2/2011
EP       2172712 A2    4/2010
(Continued)

OTHER PUBLICATIONS

International Search Report and Written Opinion dated Jan. 15, 2015 for International Application No. PCT/US2014/063834, International Filing Date Nov. 4, 2014 consisting of 12 pages.
(Continued)

*Primary Examiner* — Monzer R Chorbaji
(74) *Attorney, Agent, or Firm* — Christopher & Weisberg, P.A.

(57) ABSTRACT

A method for performing pasteurization cycles in a hot water system according to a time-temperature profile is provided. The hot water system includes a plurality of temperature sensors configured to measure temperatures of at least one fluid in the hot water system. The time-temperature profile is stored. A predefined modification criteria is stored. Fluid temperature data associated with the plurality of temperature sensors is determined. A determination is made whether the fluid temperature data meets a predefined modification criteria. The time-time temperature profile for performing a next pasteurization cycle is modified based at least in part on the determination that the fluid temperature data meets the predefined modification criteria. The next pasteurization cycle is performed in accordance with the modified time-temperature profile.

17 Claims, 5 Drawing Sheets

(51) Int. Cl.
*B01D 21/30* (2006.01)
*C02F 1/00* (2006.01)
*C02F 1/02* (2006.01)
*F24D 17/00* (2006.01)
*F24D 19/10* (2006.01)
*G05D 23/19* (2006.01)
*E03B 7/04* (2006.01)

(52) U.S. Cl.
CPC ............ *C02F 2307/14* (2013.01); *E03B 7/04* (2013.01); *F24D 2200/08* (2013.01); *F24D 2200/14* (2013.01); *Y02B 10/20* (2013.01); *Y02B 10/70* (2013.01)

(56) References Cited

FOREIGN PATENT DOCUMENTS

| GB | 2132791 A | * | 7/1984 | ............ G05D 23/19 |
|----|-----------|---|--------|-------------------------|
| WO | 2001063182 A1 | | 8/2001 | |
| WO | 2013014411 A2 | | 1/2013 | |

OTHER PUBLICATIONS

"Protecting Against Legionella Bacteria", Aug. 24, 2012, available at: www.web.archive.org/web/20120824060819/http:/www.hamworthy-heating.com/Library/Preventing-legionella.asp.
Yan Evans: "Controlling Legionella in Solar-Thermal Systems", Published Nov. 6, 2008, Modern Building Services, available at: www.modbs.co.uk/news/archivestory.php/aid/5638/Controlling_legionella_in_solar-thermal_systems.html.

* cited by examiner

DYNAMIC FLUID PASTEURIZATION

CROSS-REFERENCE TO RELATED APPLICATION

This application is related to and claims priority to U.S. Provisional Patent Application Ser. No. 61/899,677, filed Nov. 4, 2013, entitled HOT WATER PASTEURIZATION, the entirety of which is incorporated herein by reference.

STATEMENT REGARDING FEDERALLY SPONSORED RESEARCH OR DEVELOPMENT n/a

FIELD OF THE INVENTION

The present invention relates to methods, apparatuses and systems for hot water, and in particular, to performing pasteurization cycles in hot water systems.

BACKGROUND OF THE INVENTION

Existing hot water systems are common place in most societies as a means for providing on-demand hot water for cooking, cleaning, bathing and space heating, etc. These existing hot water system rely on thermodynamic processes for transferring heat energy from a heat energy source to water, thereby heating the water when needed. The energy source(s) typically consist of an on-demand heat source that use energy sources such as fossil fuels or electricity to heat the water.

While these hot water systems are useful, they are not without safety issues. The risk of incubating bacteria colonies in these hot water systems remains high. For example, the presence of *Legionella* bacteria, e.g., *Legionella pneumophila*, in hot water systems is a common problem in which *Legionella pneumonia* can cause a potentially fatal respiratory disease in humans. To address the problem of bacterial growth in hot water systems, some existing hot water systems perform a temperature pasteurization cycle of water tanks and pipes on a set schedule by triggering an on-demand heat source, e.g., boiler, to begin heating water to a set temperature for a predetermined period of time. Pasteurization heats fluid below its boiling point at temperature(s) that kill harmful microbes and waterborne pathogens. Typically, the scheduled pasteurization cycle of the hot water system will occur according to a preconfigured schedule.

In some cases, however, setting a hot water system to perform the pasteurization cycle on a set schedule waste energy. For example, a system having more than one heat source may waste heat recovery. In particular, if one heat source is solar or a biomass boiler, for example, the water may sometimes reach temperatures that pasteurize the water without running a pasteurization cycle. In other words, adhering to a set pasteurization cycle schedule may lead to situations where the water in the hot water system was pasteurized a day earlier due to an increase in solar energy collection, but the hot water system may nevertheless trigger an on-demand heating source to begin the pasteurization cycle even though pasteurization is not required for several more days.

In another situation, the water in the hot water system may reach temperatures close to the required pasteurization temperature during the middle of the week. However, the pasteurization cycle may not be set to begin for another several days, thereby preventing the hot water system from taking advantage of the fact that only a fraction of the typically heat energy needed for pasteurization will be needed to heat to the water to the required pasteurization temperature. Such a situation may occur if the variable heat source, e.g., solar based heat source, has already heated the water close to the required pasteurization temperature. Therefore, while existing hot water systems help reduce the risk of incubating bacteria colonies in hot water systems, these existing hot water systems do so in an inefficient manner that wastes energy resources and increases the cost of operating the system.

SUMMARY OF THE INVENTION

The present invention advantageously provides a method and system for modifying time-temperature profile for performing one or more pasteurization cycles in a fluid system.

In accordance with one embodiment of the invention, a controller for performing pasteurization cycles in a hot water system according to a time-temperature profile is provided. The pasteurization cycle is configured to cause the temperature of the at least one fluid in the hot water system to satisfy a predefined temperature threshold for a predefined period of time. The hot water system includes a plurality of temperature sensors configured to measure temperatures of at least one fluid in the hot water system. The controller is in communication with the plurality of temperature sensors. The controller includes a memory configured to store the time-temperature profile and store a predefined modification criteria. The controller further includes a processor configured to determine fluid temperature data associated with the plurality of temperature sensors, determine whether the fluid temperature data meets a predefined modification criteria, modify the time-temperature profile for performing a next pasteurization cycle based at least in part on the determination that the fluid temperature data meets the predefined modification criteria, and perform the next pasteurization cycle in accordance with the modified time-temperature profile.

According to one embodiment of this aspect, the predefined modification criteria defines: a minimum fluid temperature and a minimum amount of time the temperature of the fluid satisfies the minimum fluid temperature. The modified time-temperature profile configured to cause the next pasteurization cycle to occur later in time than the previously stored time-temperature profile. According to one embodiment of this aspect, the fluid temperature data includes at least one time stamp corresponding to when at least one temperature measurement was performed. The predefined criteria defines a time window before the determination of fluid temperature data is made. The predefined modification criteria is met if no fluid temperature data has at least one time stamp corresponding to the time window. The modified time-temperature profile is configured to cause the next pasteurization cycle to occur earlier in time than the previously stored time-temperature profile.

According to one embodiment of this aspect, the predefined modification criteria defines: a minimum and maximum fluid temperature defining a fluid temperature window and an amount of time the temperature of the fluid is within the fluid temperature window since a previous pasteurization cycle. The modified time-temperature profile configured to cause the next pasteurization cycle to occur earlier in time than the previously stored time-temperature profile. According to one embodiment of this aspect, the hot water system includes at least one fluid flow sensor in fluid communication with the hot water system. The controller is in communication with the at least one fluid flow sensor. The processor is further configured to: determine fluid flow data associated with the at least one fluid flow sensor and determine whether the fluid flow data meets the predefined modification criteria. The modification of the time-temperature profile for performing the next pasteurization cycle is based at least in part on the determination that that the fluid flow data meets the predefined modification criteria.

According to one embodiment of this aspect, the determined fluid flow data indicates that hot water from the system has not been one of used by the system and circulated by the system for at least a predefined amount of time. The modified time-temperature profile configured to cause the next pasteurization cycle to occur earlier in time than the previously stored time-temperature profile. According to one embodiment of this aspect, the processor is further configured to: determine additional fluid temperature data after the time-temperature profile has been modified and before the next pasteurization cycle has been performed, determine whether the additional fluid temperature data meets the predefined modification criteria, and modify the time-temperature profile for performing the next pasteurization cycle based at least in part on the determination that the additional fluid temperature data meets the predefined modification criteria. According to one embodiment of this aspect, the determined fluid temperature data indicates the hot water system has been without power for at least a predefined amount of time. The modified time-temperature profile configured to cause the next pasteurization cycle to occur upon power up of the hot water system.

In accordance with another embodiment of the invention, a hot water system for performing pasteurization cycles according to a time-temperature profile is provided. The pasteurization cycle is configured to cause the temperature of at least one fluid in the hot water system to satisfy a predefined temperature threshold for a predefined period of time. The hot water system includes a water reservoir, at least one heat source in thermal communication with the water reservoir and a plurality of temperature sensors, the plurality of temperature sensors configured to measure at least one temperature of at least water in the water reservoir. The hot water system further includes a controller in communication with the plurality of temperature sensors. The controller includes a memory configured to store the time-temperature profile and store a predefined modification criteria. The controller further includes a processor configured to determine fluid temperature data associated with the plurality of temperature sensors, determine whether the fluid temperature data meets a predefined modification criteria, modify the time-temperature profile for performing a next pasteurization cycle based at least in part on the determination that the fluid temperature data meets the predefined modification criteria and perform the next pasteurization cycle in accordance with the modified time-temperature profile.

According to one embodiment of this aspect, the at least one heat source includes a solar panel based heat source. The solar panel based heat source is configured to transfer heat to the water of the water reservoir via a first fluid. According to one embodiment of this aspect, the predefined modification criteria defines a minimum fluid temperature and a minimum amount of time the temperature of the fluid satisfies the minimum fluid temperature. The modified time-temperature profile is configured to cause the next pasteurization cycle to occur later in time than the previously stored time-temperature profile. According to one embodiment of this aspect. The fluid temperature data includes at least one time stamp corresponding to when at least one temperature measurement was performed. The predefined criteria defines a time window before the determination of fluid temperature data is made. The predefined modification criteria is met if no fluid temperature data has at least one time stamp corresponding to the time window. The modified time-temperature profile is configured to cause the next pasteurization cycle to occur earlier in time than the previously stored time-temperature profile.

According to one embodiment of this aspect, the predefined modification criteria defines a minimum and maximum fluid temperature defining a fluid temperature window and an amount of time the temperature of the fluid is within the fluid temperature window since a previous pasteurization cycle. The modified time-temperature profile is configured to cause the next pasteurization cycle to occur earlier in time than the previously stored time-temperature profile. According to one embodiment of this aspect, the system further includes at least one fluid flow sensor in fluid communication with water entering the water reservoir. The controller is in communication with the at least one flow sensor. The processor of the controller is further configured to determine fluid flow data associated with the at least one fluid flow sensor and determine whether the fluid flow data meets the predefined modification criteria. The modification of the time-temperature profile for performing the next pasteurization cycle is based at least in part on the determination that that the fluid flow data meets the predefined modification criteria. According to one embodiment of this aspect, the determined fluid flow data indicates the hot water system has been without power for at least a predefined amount of time. The modified time-temperature profile is configured to cause the next pasteurization cycle to occur earlier in time than the previously stored time-temperature profile. According to one embodiment of this aspect, the processor of the controller is further configured to: determine additional fluid temperature data after the time-temperature profile has been modified and before the next pasteurization cycle has been performed, determine whether the additional fluid temperature data meets the predefined modification criteria and modify the time-temperature profile for performing the next pasteurization cycle based at least in part on the determination that the additional fluid temperature data meets the predefined modification criteria. According to one embodiment of this aspect, the determined fluid temperature data indicates the hot water system has been without power for at least a predefined amount of time. The modified time-temperature profile is configured to cause the next pasteurization cycle to occur upon power up of the hot water system.

In accordance with another embodiment of the invention, a method for performing pasteurization cycles in a hot water system according to a time-temperature profile is provided. The pasteurization cycle is configured to cause the temperature of at least one fluid in the hot water system to satisfy a predefined temperature threshold for a predefined period of time. The hot water system includes a plurality of temperature sensors configured to measure temperatures of at least one fluid in the hot water system. The time-temperature profile is stored. A predefined modification criteria is stored. Fluid temperature data associated with the plurality of temperature sensors is determined. A determination is made whether the fluid temperature data meets a predefined modification criteria. The time-time temperature profile for performing a next pasteurization cycle is modified based at least in part on the determination that the fluid temperature data meets the predefined modification criteria. The next pasteurization cycle is performed in accordance with the modified time-temperature profile.

According to one embodiment of this aspect, the hot water system includes at least one fluid flow sensor in fluid communication with the hot water system. Fluid flow data associated with the at least one fluid flow sensor is determined. A determination is made whether the fluid flow data meets the predefined modification criteria. The modification of the time-temperature profile for performing the next pasteurization cycle is based at least in part on the determination that that the fluid flow data meets the predefined modification criteria. According to one embodiment of this aspect, additional fluid temperature data is determined after the time-temperature profile has been modified and before the next pasteurization cycle has been initialized. A determination is made whether the additional fluid temperature data meets the predefined modification criteria. The time-temperature profile for performing the next pasteurization cycle is modified based at least in part on the determination that the additional fluid temperature data meets the predefined modification criteria.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
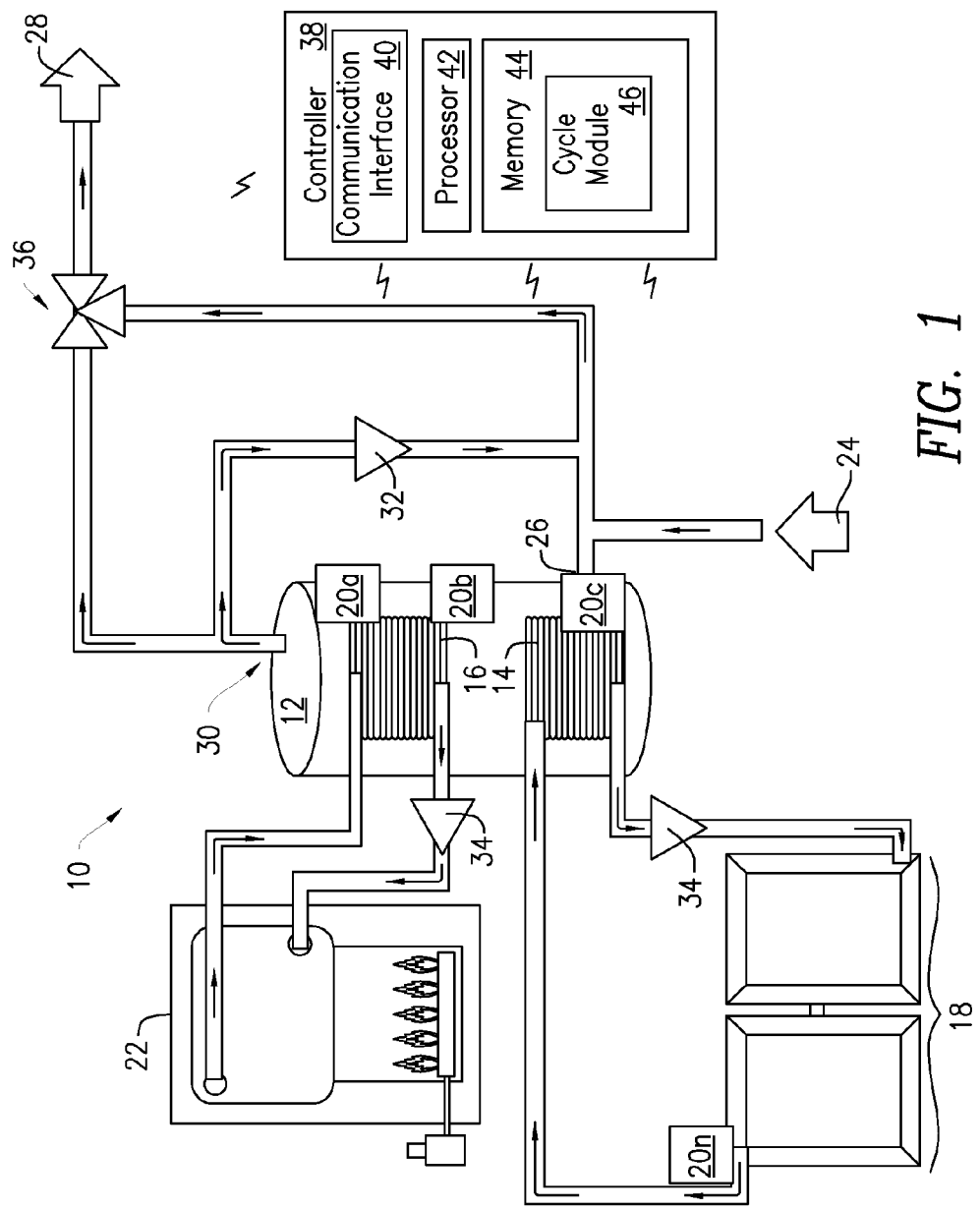
FIG. 1 is a block diagram of an embodiment of an exemplary system that dynamically modifies a time-temperature profile for performing one or more pasteurization cycles in accordance with the principles of the present invention.

The system, controller and methods described herein provide for dynamically modifying a time-temperature profile for performing one or more pasteurization cycles in a fluid system such as a hot water system. In particular, the system determines a precise need, on an ad hoc basis, for pasteurization in a hot water system by monitoring the time-temperature history of the water in several locations in the hot water system and comparing the history to a desired time-temperature profile. The pasteurization schedule or time-temperature profile, including required initiation time, fluid temperature and duration, can be dynamically modified to save unnecessary pasteurization cycles by using available renewable heat sources, when available, instead of relying on fuel-based heat sources.

Accordingly, the system, controller and method components have been represented where appropriate by conventional symbols in the drawings, showing only those specific details that are pertinent to understanding the embodiments of the concepts described herein so as not to obscure the disclosure with details that will be readily apparent to those of ordinary skill in the art having the benefit of the description herein.

Before describing in detail exemplary embodiments that are in accordance with the disclosure, it is noted that the embodiments reside primarily in combinations of system components and processing steps related to dynamically modifying the time-temperature profile for performing one or more pasteurization cycles in a fluid system. Accordingly, components have been represented where appropriate by conventional symbols in the drawings, shown only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical, thermal or data communication, which may be accomplished by physical contact, induction, electromagnetic radiation, radio signaling, infrared signaling or optical signaling, thermodynamic processes, for example. One having ordinary skill in the art will appreciate that multiple components may interoperate and modifications and variations are possible of achieving the communication.

Referring now to drawing figures in which like reference designators refer to like elements there is shown in FIG. 1 an exemplary system for dynamically modifying the time-temperature profile for performing one or more pasteurization cycles in a fluid system such as a hot water system in accordance with the principles of the disclosure and designated generally as "10." System 10 includes a fluid reservoir 12, e.g., fluid vessel, container and the like, that is in thermal communication with first and second heat exchangers 14 and 16 that transfer heat energy to the fluid in fluid reservoir 12. In one embodiment, the fluid in fluid reservoir 12 is water. First heat exchanger 14 is in communication with solar panels 18, which captures solar energy as heat at solar panels 18 and transmits the heat to first heat exchanger 14 to heat fluid in water reservoir 12. Solar panel 18 may a fluid-based system and may include one of more temperature sensors such as temperature sensor 20 at an outlet of solar panels 18. Temperature sensor 20n measures the temperature of, and is in thermal communication with, the heat transfer fluid of solar panel 18. Second heat exchanger 16 is in communication with boiler 22, which is a backup on-demand heat source that provides heat to the second heat exchanger 16. While boiler 22 is illustrated in FIG. 1, boiler 22 may be replaced by one or more other on-demand heat sources or the one or more on-demand heat sources may be added to system 10 in addition to boiler 22.

System 10 includes cold fluid supply 24 that provides cold fluid, e.g., water, to system 10 at cold fluid inlet 26 of fluid reservoir 12. System 10 includes a hot fluid output 28 that provides hot fluid, for example, hot water to plumbing fixtures (not pictured). The plumbing fixtures may be thermal loads where either fluid or heat is removed from system 10 by, for example, a faucet or a radiator. Fluid reservoir 12 provides hot fluid to hot fluid output 28 and a hot fluid outlet 30. Fluid reservoir 12 includes one or more temperature sensors 20. In one embodiment, fluid reservoir 12 includes temperature sensors 20a-20c that are in thermal communication with the fluid reservoir 12 and are configured to measure temperature of fluid at the cold fluid inlet 26, at a location in the fluid reservoir 12 between the cold fluid inlet 26 and the hot fluid outlet 30, and at hot fluid outlet 30, respectively. Temperature sensors 20 communicate with controller 34 via one or more wireless and/or wired communication paths, and/or via one or more communication networks.

System 10 includes de-stratification circulator 32 in communication with controller 38. In one embodiment, de-stratification circulator 32 is a hot water re-circulator pump that provides uniform temperature distribution of the fluid in fluid reservoir 12 by re-circulating the fluid in fluid reservoir 12. De-stratification circulator 32 provides circulation of fluid such that the fluid in the fluid reservoir 12 is substantially uniformly heated with heat from second heat exchanger 16 and/or heat from the first heat exchanger 14. In other words, the de-stratification circulator 32 disrupts any stratified layers of heated fluid in fluid reservoir 12 to more uniformly heat an entire volume of fluid in fluid reservoir 12.

In one embodiment, system 10 includes one or more circulator pumps 34 in communication with controller 38. Circulator pump 34 is configured to circulate fluid from solar panels 18 to first heat exchanger 14 and from the boiler 22 to the second heat exchanger 16. In one embodiment, system 10 includes anti-scald valve 36 that is configured to prevent fluid at hot fluid output 28 from reaching scalding temperatures or a maximum predefined temperature, by mixing cold fluid from the cold fluid supply 24 with hot fluid from the hot fluid outlet 30 to reduce a temperature of the fluid at the hot fluid output 28.

It will be appreciated that although solar panel 18 is disclosed, other heat collectors, heat sources and/or thermal sources may be substituted or used in combination to provide heat to one or more heat exchangers in fluid reservoir 12 including, but not limited to, waste heat, geothermal, heat pumps, biomass boilers, available heat from storage tanks, among other non-on-demand or variable heat sources. It will be further appreciated that the boiler 22 may be a conventional boiler that consumes a fuel including, for example, coal, natural gas or propane into heat. Because second heat exchanger 16 and boiler 22 are a backup heat source for system 10, second heat exchanger 16 is located closer to hot water outlet 28 than first heat exchanger 14 to provide rapid hot water temperature recovery.

System 10 includes controller 38 that is configured to perform various functions described herein including dynamically modifying the time-temperature profile for performing one or more pasteurization cycles, e.g., for initiating, sustaining and terminating one or more pasteurization cycles. Controller 38 includes one or more communication interfaces 40 for communicating with sensors, circulators and/or devices, etc. of system 10. Communication interface 40 may include a network interface card or wireless transceiver, for example, configured to place controller 38 in communication with a data network such as a local area network (LAN), wide area network (WAN) and the Internet. Communication interface 40 enables system 10 to be monitored and adjusted remotely over the Internet. Controller 38 may be additionally configured to provide email, text or short message service (SMS) alerts when system 10 is not functioning as intended or as described herein.

In one embodiment, controller 38 communicates with temperature sensors 20 for receiving fluid temperature measurements. Controller 38 may be further configured to communicate measurements and system characteristics to one or more user devices (not shown). Controller 38 includes processor 42 that is in communication with communication interface 40. Controller 38 includes memory 44 in communication with communication interface 40 and processor 42. Memory 44 is configured to store data, time history of data, predefined modification criteria, schedule(s) or time-temperature profile(s) for performing one or more pasteurization cycles, and one or more modules. For example, a time-temperature profile defines one or more fluid temperature thresholds over one or more periods of time. The time-temperature profile may also define one or more pasteurization cycle initiation times, one or more duration periods for pasteurization cycles, and one or more pasteurization cycle termination times. The time-temperature profile provides a modifiable pasteurization cycle schedule for performing one or more pasteurization cycles using one or more on-demand energy sources and/or non-on-demand energy sources, as described herein.

Memory 44 may include non-volatile and volatile memory. For example, non-volatile memory may include a hard drive, flash memory, memory stick and the like. Also, volatile memory may include random access memory and others known in the art. Memory 44 may store program instructions such as those for cycle module 46. For example, cycle module 46 includes instructions, which when executed by processor 42, cause processor 42 to modify the time-temperature profile for performing one or more pasteurization cycles, discussed in detail with respect to FIG. 5.

Figure 2:
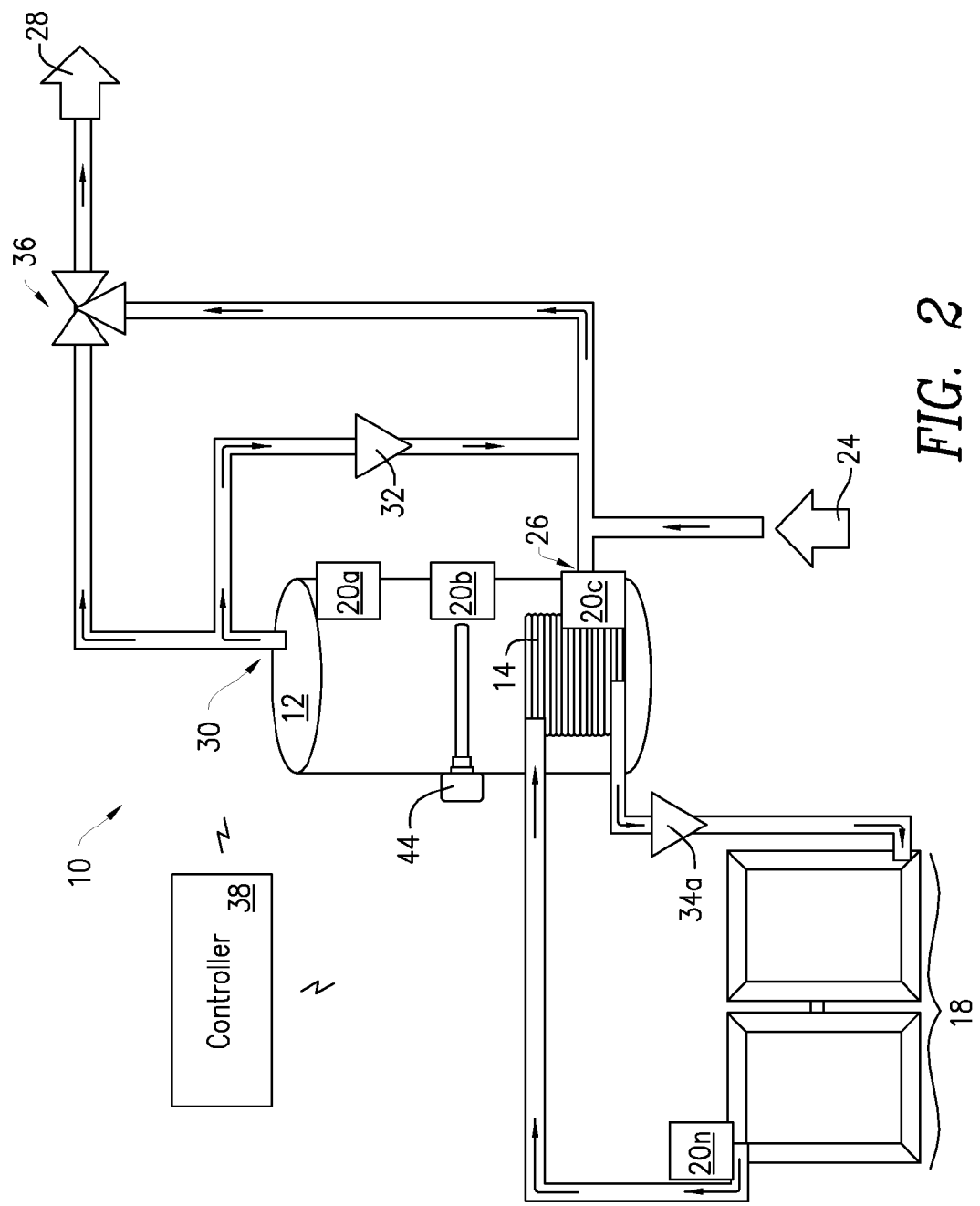
FIG. 2 is a block diagram of another embodiment of an exemplary system that dynamically modifies a time-temperature profile for performing one or more pasteurization cycles in accordance with the principles of the present invention.

Another embodiment of system 10 for dynamically modifying a time-temperature profile for performing one or more pasteurization cycles in a fluid system is illustrated in FIG. 2. In this embodiment, boiler 22 has been replaced by one or more electronic heating elements 44 that are configured to heat fluid, e.g., water, in fluid reservoir 12. For example, electronic heating element 44 is in thermal communication with, and configured to heat, the fluid in fluid reservoir 12.

Figure 5:
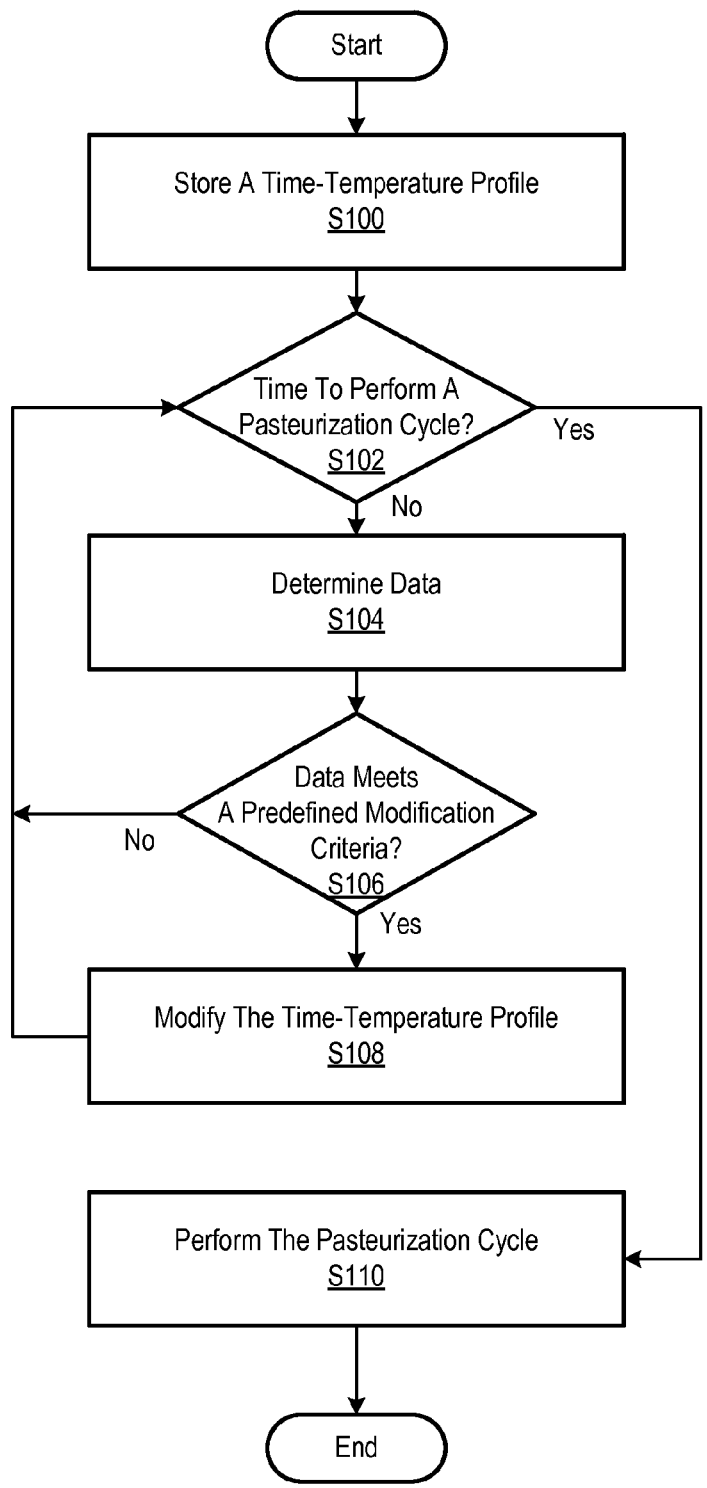
FIG. 5 is a process flow diagram of an exemplary cycle modification process for modifying a time-temperature profile for performing one or more pasteurization cycles in accordance with the principles of the present invention.

Controller 38 modifies the time-temperature profile based at least in part on received measurement data, and performs pasteurization cycle initiation in accordance with the modified time-temperature pasteurization cycle as discussed above with respect to FIG. 1 and below with respect to FIG. 5.

Figure 3:
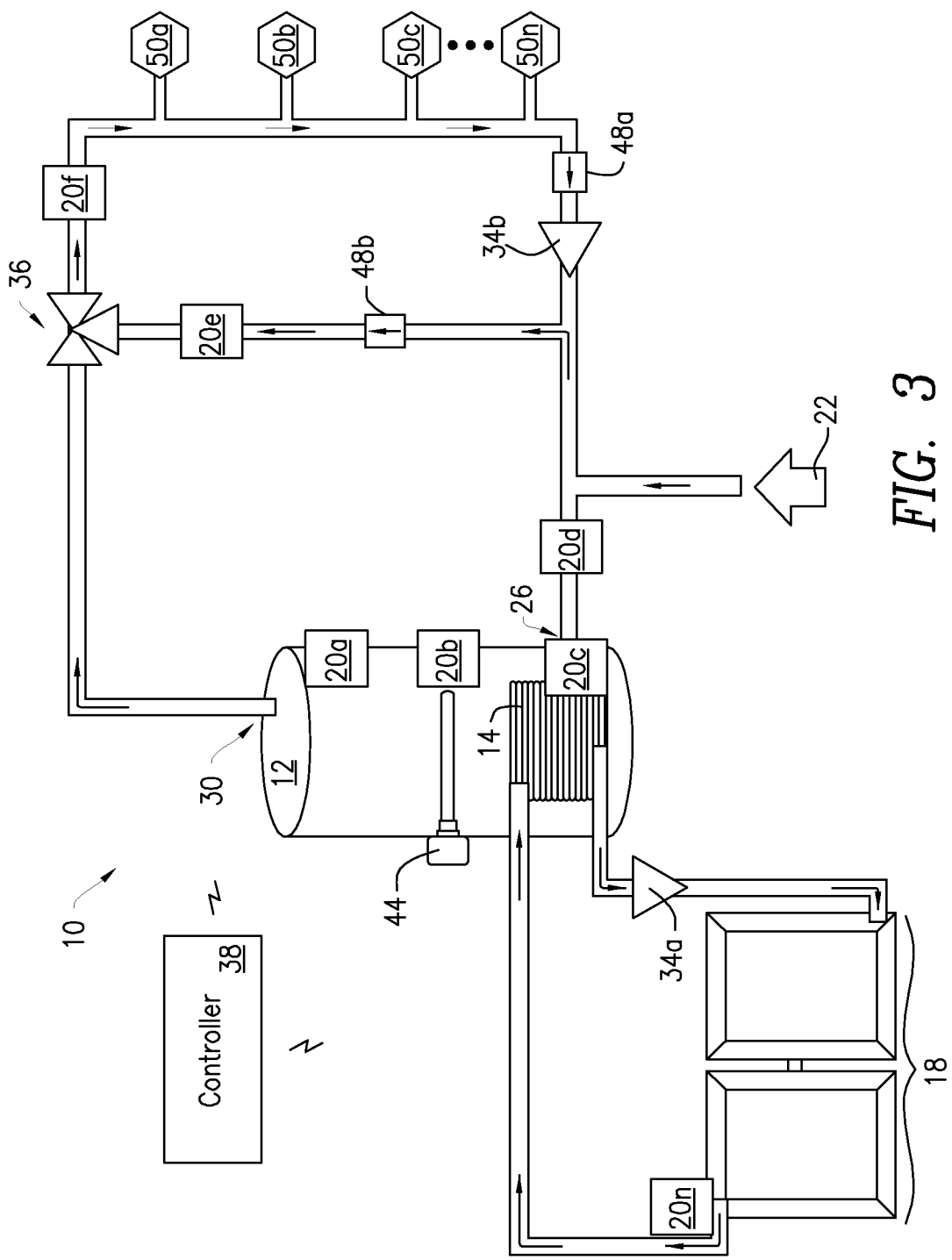
FIG. 3 is a block diagram of yet another embodiment of an exemplary system that dynamically modifies a time-temperature profile for performing one or more pasteurization cycles in accordance with the principles of the present invention.

Another embodiment of system 10 for dynamically modifying the time-temperature profile for performing pasteurization cycles in a fluid system is illustrated in FIG. 3. System 10 is similar to system 10 of FIG. 2, discussed above, but is configured to include a hot water recirculation system. Hot water recirculation system includes recirculator pump 34b and check valve 48a. Check valve 48a is configured to permit fluid flow in a single direction. In one embodiment, recirculator pump 34b and check valve 48a may be located proximate a fixture, e.g., 50n, farthest from the fluid reservoir 12. Recirculator pump 34 sends fluid from the farthest fixture, e.g., 50n, to one or more paths including back to the fluid reservoir 12 and/or back to anti-scald valve 36. The balance between the two paths is set by anti-scald valve 36. Temperature sensor 20d measures the temperature of, and is in thermal communication with, the fluid at the cold fluid inlet 26 before entering fluid reservoir 12. Check valve 48b is configured to control fluid flow to anti-scald valve 36 and a temperature sensor 20e measures the temperature of, and is in thermal communication with, the fluid entering anti-scald valve 36. Temperature sensor 20f measures the temperature of, and is in thermal communication with, the fluid exiting the anti-scald valve 36. In one embodiment, the hot water recirculation system, when pumping, performs de-stratification of the fluid in fluid reservoir 12.

Figure 4:
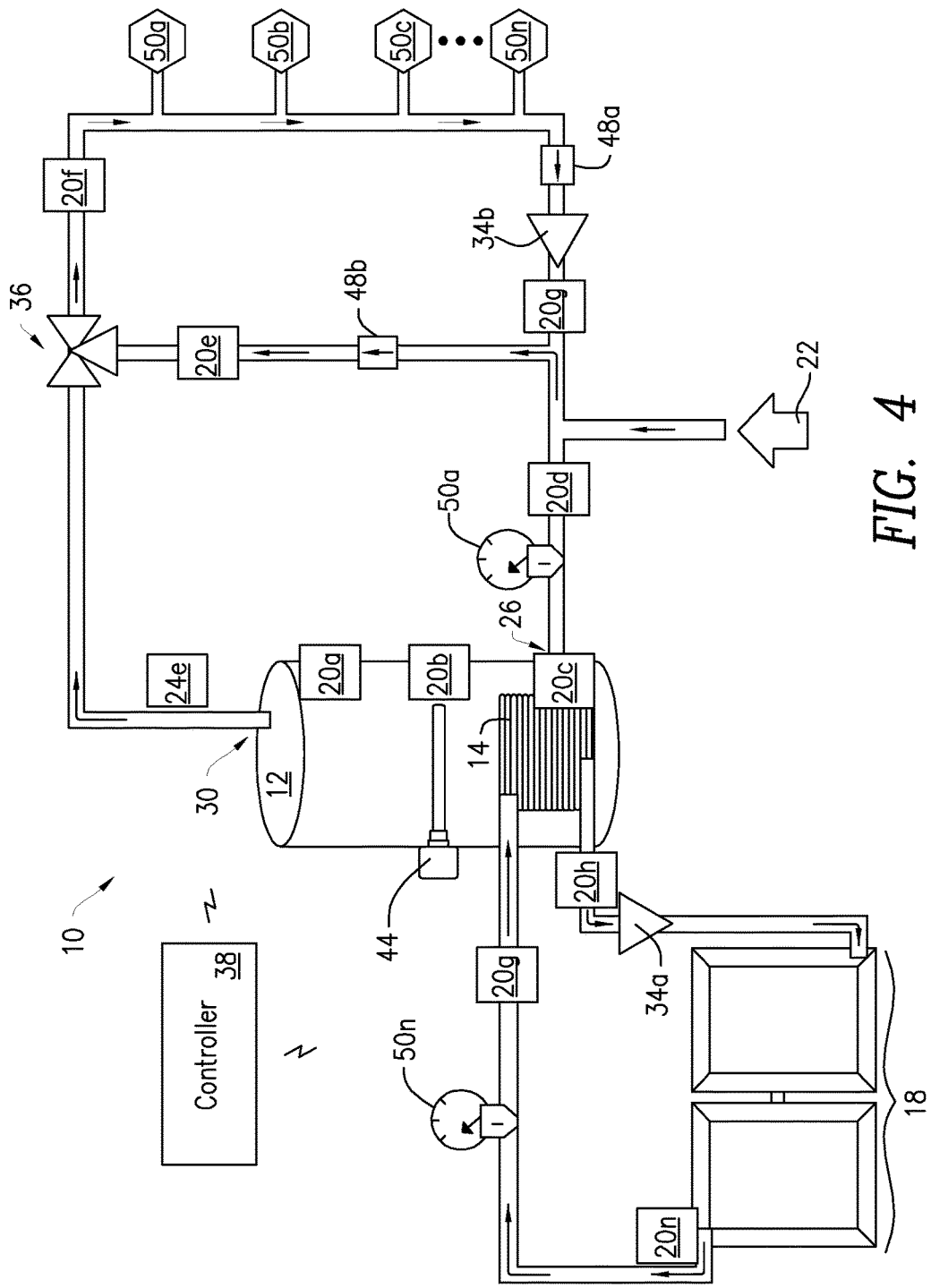
FIG. 4 is a block diagram of yet another embodiment of an exemplary system that dynamically modifies a time-temperature profile for performing one or more pasteurization cycles in accordance with the principles of the present invention.

Another exemplary embodiment of system 10 is described with reference to FIG. 4. System 10 includes one or more temperature sensors 20 in communication with controller 38. Temperature sensors 20 such as temperature sensors 20g, 20h and 20n are in thermal communication with fluid circulating in the solar panel circulation loop for measuring fluid temperature. Temperature sensors 20g and 20h measure and report the temperatures of the heat transfer fluid of solar panels 18 at the cold supply line and the hot return line of the solar panel circulation loop, respectively. Further, system 10 includes one or more flow sensors 50a-50n in communication with controller 38. Flow sensor 50 is configured to measure and report the flow of fluid in system 10. For example, flow sensor 50n is in communication with a supply line of the solar panels 18 and is configured to measure a volume of heat transfer fluid circulating in the hot return line of solar panels 18.

Flow sensor 50a is in communication with a supply line leading to the cold fluid inlet 26 of fluid reservoir 12 and measures a volume of fluid entering fluid reservoir 12. Flow sensors 50a and 50n may, for example, measure a volume of fluid or a velocity of fluid flowing in the respective lines. In one embodiment, an additional temperature sensor measures the temperature of, and is in thermal communication with, fluid exiting the fluid reservoir 12 from hot fluid outlet 30. Temperature sensor 20j measures the temperature of, and is in thermal communication with, fluid exiting the recirculator pump 34b. Similar to the embodiments of FIGS. 1-3, controller 38 is in communication with temperature sensors 20, circulator pumps 34, and/or flow sensors 50.

According to some exemplary embodiments, solar panels 18 may include a light sensor (not pictured) in communication with the controller 38. The light sensor may be, for example, a photo detector, configured to determine an intensity of light being received at solar panels 18. Controller 38 may use this light sensor data to modify the time-temperature profile or schedule for performing one or more pasteurization cycles, e.g., may delay the next pasteurization cycle during cloudy conditions or may expedite the pasteurization cycle during sunny conditions where solar panel 18 will be able to contribute energy for performing a pasteurization cycle, thereby reducing the consumption of non-renewable resources used by on-demand heat sources such as boiler 22 or electric heating element 44. It will be appreciated that elements described hereinabove are not limited to the configurations shown and that the elements may be configured and combined to accomplish the functions described below.

According to exemplary embodiments described above, controller 38 monitors flow, i.e., fluid volume and/or velocity, in at least two locations of system 10 to determine an amount of heat energy that is used by system 10, and that is supplied by each of the heat sources, e.g., the solar panels 18. According to other exemplary embodiments, controller 38 also monitors flow in at least two locations, and based on the power consumed by heating element 44, determines an amount of heat energy that is used by the hot water system, and that is supplied by each of the heat sources. This data may be used by controller 38 for determining whether to modify the time-temperature profile for performing one or more pasteurization cycles. In other words, flow data may be used by processor 42 to determine whether to modify a time-temperature profile for performing one or more pasteurization cycles, e.g., delay a next pasteurization cycle if the measured flow level is below a threshold.

According to other exemplary embodiments, controller 38 determines an amount of heat energy in fluid reservoir 12 of system 10 by calculating the heat energy in the reservoir from the temperature-time history of fluid temperatures in fluid reservoir 12. Using the determined amount of heat energy in fluid reservoir 12, controller 38 determines the amount of heat energy that is used by system 10, e.g., hot water system, and that is supplied by each of the heat sources. According to some exemplary embodiments, controller 38 may be configured to control either pressurized glycol or drain-back solar collector pumping schemes. Controller 38 may be configured to control other renewable heat sources such as wood boilers, heat pumps and waste heat recovery systems. According to still other exemplary embodiments, controller 38 may be configured to control overheating in the collectors by either heat dumping or by allowing the heat collectors to self-cool. According to exemplary embodiments of the present invention, the hot water systems described herein may be built as the domestic hot water systems.

An exemplary process flow diagram of an exemplary cycle modification process of cycle module 46 for modifying the time-temperature profile for performing one or more pasteurization cycle(s) is described with reference to FIG. 5. Processor 42 causes a time-temperature profile for performing one or more pasteurization cycles to be stored in memory 44 (Block S100). For example, the time-temperature profile may indicate a time for initiating one or more next pasteurization cycle, a time the previous pasteurization cycle was performed, and other information related to the timing of pasteurization cycles. In one embodiment, the time at which the next pasteurization cycle is performed may be based on a predefined and modifiable time-temperature profile, e.g., run a pasteurization cycle every four days or on a particular day/time, which may be stored in memory 44. Processor 42 may determine and store the time-temperature profile indicating when to perform the next pasteurization cycle based at least in part on when the previous cycle occurred. In another embodiment, the stored time-temperature profile for performing one or more pasteurization cycles may be set by a user. Processor 42 determines whether it is time to perform a pasteurization cycle based on the stored time-temperature profile (Block S102). For example, processor 42 may compare the current time with the stored time-temperature profile such that if the current time equals or has passed a specified time in time-temperature profile for initiating a pasteurization cycle, a pasteurization cycle is initiated.

If processor 42 determines it is not time to perform pasteurization, processor 42 determines data, e.g., measurement data, control pump data and the like, associate with sensors (Block S104). For example, processor 42 may determine measurement or sensor data that has been received since the last pasteurization cycle. In another embodiment, processor 42 may determine measurement or sensor data that corresponds to a predefined time window, e.g., within four days before the time when the determination of Block S104 is made based on time stamps associated with the data. During normal operation, sensors 20/50 and circulator pumps 32/34 may periodically send sensor data to controller 38 at the request of controller 38 and/or a predetermined time intervals. However, during abnormal operation, e.g., during a power outage, controller 38 may not receive any sensor data during the span of the power outage such that in the determination of Blocks S104 determines data that indicates a lack of or limited sensor and/or device data has been collected.

Processor 42 determines whether the data meets a predefined modification criteria (Block S106). The predefined modification criteria defines one or more rules for determining whether to modify the time-temperature profile for performing one or more pasteurization cycles. For example, the time-temperature profile may be modified such that the next pasteurization cycle is expedited, i.e., is performed earlier in time than the currently stored time for performing the next pasteurization cycle. In another example, the time-temperature profile may be modified such that the next pasteurization cycle is delayed, i.e., is performed later in time than the currently stored time for performing the next pasteurization cycle. In yet another example, the time-temperature profile may remain the same when the data does not meet or satisfy the predefined modification criteria.

In one example, the predefined modification criteria defines a minimum fluid temperature and a minimum amount of time the temperature of the fluid is required to satisfy the minimum fluid temperature. In other words, the predefined modification criteria is met when the temperature of the fluid in fluid reservoir 12 is equal to or greater than a predefined temperature, e.g., 60 degrees Fahrenheit, for a predefined amount of time. In this case, system 10 may have performed a pasteurization cycle before the scheduled next pasteurization cycle indicated by the time-temperature profile, possibly due to additional heat energy that was provided by a variable heat source, e.g., solar power based heat source, and therefore can delay the pasteurization cycle. The amount of delay may be predefined by the user or manufacture.

In another embodiment, the predefined criteria defines a minimum amount of data that is required to correspond to a predefined time window. For example, the minimum amount of data may be at least one measurement from all temperature and/or flow sensors. Further, the predefined time window may be a predefined time window after the last pasteurization cycle or a predefined time window before the determination Block S104 is made. In other words, the predefined modification criteria allows processor to determine whether data from one or more sensors 20/50 and/or pumps 32/34 has been received during a predefined time period, and if so, how much data. Such a predefined criteria may indicate that system 10 may be have loss power or has been turned off since that no data has been received during the predefined time window or may indicate that one or more sensors have failed if data is only received from a portion of sensors and/or control pumps. Therefore, the time-temperature profile for performing the pasteurization cycle may be modified to expedite the pasteurization cycle since it is likely that system 10 has skipped at least one pasteurization cycle and/or the fluid in fluid reservoir 12 is at bacteria friendly temperature. In one embodiment, the pasteurization may be performed upon system 10 start-up. Further, a user may be notified via electronic notification, e.g., email, text and the like, each time a pasteurization cycle is expected or delayed.

In another embodiment, the predefined modification criteria defines a minimum fluid temperature and an amount of time the temperature of the fluid satisfies the minimum fluid temperature since the previous pasteurization cycle. For example, the minimum fluid temperature may correspond to the minimum temperature for performing a pasteurization cycle and the amount of time may correspond to less than an amount of time required for the pasteurization cycle to be completed. In this case, at least one heating source such as a solar panel based heating source provided additional heat, e.g., due to a sunny day, to perform a portion of the pasteurization cycle but fell short of actually performing the entire pasteurization cycle, i.e., maintaining the fluid in the fluid reservoir 12 at a minimum temperature for a predefined amount of time. As will be discussed below, system 10 takes advantage of the fact that a portion of the pasteurization cycle has been performed and may expedite the scheduled pasteurization cycle such that the on-demand or fuel based heat source, e.g., boiler 22 or electronic heating element 44, completes the already started pasteurization cycle at a fraction of fuel cost of performing the entire pasteurization cycle. The predefined modification criteria may include other rules, parameters and/or threshold for determining whether the data determined in Step S102 indicates the scheduled next pasteurization cycle should be modified.

If processor 42 determines the data, e.g., fluid temperature data, does not meet the predefined modification criteria, processor 42 may perform the determination of Block S102. For example, processor 42 may wait a predefined amount of time before performing Block S102 such that new data may be determined. If processor 42 determines the data meets the predefined modification criteria, processor 42 modifies the time-temperature profile (Block S108). For example, processor 42 modifies one or more time parameters and/or temperature thresholds defined by the time-temperature profile such that one or more next pasteurization cycle are modified. For example, as discussed above, the next scheduled pasteurization cycle may be expedited or delayed based on the determined data. Delay of the next pasteurization cycle or of the pasteurization schedule may include delaying the pasteurization cycle by a predefined time or based on a predefined rule. Expediting the next pasteurization cycle or the pasteurization schedule may include: moving up (in time) the scheduled pasteurization cycle by a predefined amount of time, performing a pasteurization cycle within a predefined amount of time from the current time and/or immediately performing pasteurization. In other words, the time parameters in the time-temperature profile are modified. In another example, the temperature thresholds for the next pasteurization cycle defined by the time-temperature profile are modified. The modified time-temperature profile is stored in memory 44.

Referring back to Block S102, if processor 42 determines it is time to perform the scheduled pasteurization cycle based on the stored time-temperature profile, processor 42 initiates the pasteurization cycle (Block S110). For example, process 42 may trigger one or more on-demand heat sources such as boiler 22 and/or electric heating element 44 to heat the fluid in fluid reservoir 12 to a minimum required temperature for pasteurization for a predefined amount of time. In another example, processor 42 may initiate the pasteurization cycle without having to initially trigger one or more on-demand heat sources to heat fluid in fluid reservoir 12 in case the fluid temperature(s) already satisfy one or more temperature threshold defined in the time-temperature profile. In this example, one or more renewable energy sources such as solar panel 18 may have heated the fluid to satisfy one or more temperature thresholds defined in time-temperature profile in which one or more on-demand heat sources may later be triggered during the pasteurization cycle to help ensure the fluid temperature satisfies the time-temperature profile.

In one embodiment, after initiating the pasteurization cycle or upon completion of the pasteurization cycle, processor 42 may perform Block S100, thereby storing time-temperature profile for performing one or more next pasteurization cycles. As discussed above, the next pasteurization cycle may be set to a predefined time after the previous pasteurization cycle occurred and/or may be set to a predefined date/time, etc. Therefore, system 10 advantageously reduces the amount of resources consumed by on-demand heat sources for performing pasteurization cycles by taking into account heat energy provided by renewable energy resources, as described herein.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A controller for performing pasteurization cycles in a hot water system according to a time-temperature profile, the pasteurization cycle configured to cause the temperature of the at least one fluid in the hot water system to satisfy a predefined temperature threshold for a predefined period of time, the hot water system including a plurality of temperature sensors configured to measure temperatures of at least one fluid in the hot water system, the controller being in communication with the plurality of temperature sensors, the controller comprising:
a memory, the memory configured to:
store the time-temperature profile; and
store a predefined modification criteria;
a processor, the processor configured to:
determine fluid temperature data associated with the plurality of temperature sensors;
determine whether the fluid temperature data meets a predefined modification criteria;
modify the time-temperature profile for performing a next pasteurization cycle based at least in part on the determination that the fluid temperature data meets the predefined modification criteria; and
perform the next pasteurization cycle in accordance with the modified time-temperature profile.

2. The controller of claim 1, wherein the predefined modification criteria defines:
a minimum fluid temperature; and
a minimum amount of time the temperature of the fluid satisfies the minimum fluid temperature; and
the modified time-temperature profile configured to cause the next pasteurization cycle to occur later in time than the previously stored time-temperature profile.

3. The controller of claim 1, wherein the fluid temperature data includes at least one time stamp corresponding to when at least one temperature measurement was performed;
the predefined criteria defining a time window before the determination of fluid temperature data is made, the predefined modification criteria being met if no fluid temperature data has at least one time stamp corresponding to the time window; and
the modified time-temperature profile configured to cause the next pasteurization cycle to occur earlier in time than the previously stored time-temperature profile.

4. The controller of claim 1, wherein the predefined modification criteria defines:
a minimum and maximum fluid temperature defining a fluid temperature window; and
an amount of time the temperature of the fluid is within the fluid temperature window since a previous pasteurization cycle; and
the modified time-temperature profile configured to cause the next pasteurization cycle to occur earlier in time than the previously stored time-temperature profile.

5. The controller of claim 1, wherein the hot water system includes at least one fluid flow sensor in fluid communication with the hot water system, the controller being in communication with the at least one fluid flow sensor;
the processor is further configured to:
determine fluid flow data associated with the at least one fluid flow sensor; and
determine whether the fluid flow data meets the predefined modification criteria; and
the modification of the time-temperature profile for performing the next pasteurization cycle being based at least in part on the determination that that the fluid flow data meets the predefined modification criteria.

6. The controller of claim 5, wherein the determined fluid flow data indicates that hot water from the system has not been one of used by the system and circulated by the system for at least a predefined amount of time; and
the modified time-temperature profile configured to cause the next pasteurization cycle to occur earlier in time than the previously stored time-temperature profile.

7. The controller of claim 1, wherein the processor is further configured to:
determine additional fluid temperature data after the time-temperature profile has been modified and before the next pasteurization cycle has been performed;
determine whether the additional fluid temperature data meets the predefined modification criteria; and
modify the time-temperature profile for performing the next pasteurization cycle based at least in part on the determination that the additional fluid temperature data meets the predefined modification criteria.

8. The controller of claim 1, wherein the determined fluid temperature data indicates the hot water system has been without power for at least a predefined amount of time; and
the modified time-temperature profile configured to cause the next pasteurization cycle to occur upon power up of the hot water system.

9. A hot water system for performing pasteurization cycles according to a time-temperature profile, the pasteurization cycle configured to cause the temperature of at least one fluid in the hot water system to satisfy a predefined temperature threshold for a predefined period of time, the hot water system comprising:
a water reservoir;
at least one heat source in thermal communication with the water reservoir;
a plurality of temperature sensors, the plurality of temperature sensors configured to measure at least one temperature of at least water in the water reservoir;
a controller in communication with the plurality of temperature sensors, the controller including:
a memory, the memory configured to:
store the time-temperature profile; and
store a predefined modification criteria;
a processor, the processor configured to:
determine fluid temperature data associated with the plurality of temperature sensors;
determine whether the fluid temperature data meets a predefined modification criteria;
modify the time-temperature profile for performing a next pasteurization cycle based at least in part on the determination that the fluid temperature data meets the predefined modification criteria;
perform the next pasteurization cycle in accordance with the modified time-temperature profile.

10. The system of claim 9, wherein the at least one heat source includes a solar panel based heat source, the solar panel based heat source configured to transfer heat to the water of the water reservoir via a first fluid.

11. The system of claim 9, wherein the predefined modification criteria defines:
a minimum fluid temperature; and
a minimum amount of time the temperature of the fluid satisfies the minimum fluid temperature; and
the modified time-temperature profile configured to cause the next pasteurization cycle to occur later in time than the previously stored time-temperature profile.

12. The system of claim 9, wherein the fluid temperature data includes at least one time stamp corresponding to when at least one temperature measurement was performed;
the predefined criteria defining a time window before the determination of fluid temperature data is made, the predefined modification criteria being met if no fluid temperature data has at least one time stamp corresponding to the time window; and the modified time-temperature profile configured to cause the next pasteurization cycle to occur earlier in time than the previously stored time-temperature profile.

13. The system of claim 9, wherein the predefined modification criteria defines:
   a minimum and maximum fluid temperature defining a fluid temperature window;
   an amount of time the temperature of the fluid is within the fluid temperature window since a previous pasteurization cycle; and
   the modified time-temperature profile configured to cause the next pasteurization cycle to occur earlier in time than the previously stored time-temperature profile.

14. The system of claim 9, further comprising at least one fluid flow sensor in fluid communication with water entering the water reservoir, the controller being in communication with the at least one flow sensor; and
   the processor of the controller being further configured to:
      determine fluid flow data associated with the at least one fluid flow sensor; and
      determine whether the fluid flow data meets the predefined modification criteria; and
      the modification of the time-temperature profile for performing the next pasteurization cycle being based at least in part on the determination that that the fluid flow data meets the predefined modification criteria.

15. The system of claim 14, wherein the determined fluid flow data indicates the hot water system has been without power for at least a predefined amount of time; and
   the modified time-temperature profile is configured to cause the next pasteurization cycle to occur earlier in time than the previously stored time-temperature profile.

16. The system of claim 9, wherein the processor of the controller is further configured to:
   determine additional fluid temperature data after the time-temperature profile has been modified and before the next pasteurization cycle has been performed;
   determine whether the additional fluid temperature data meets the predefined modification criteria; and
   modify the time-temperature profile for performing the next pasteurization cycle based at least in part on the determination that the additional fluid temperature data meets the predefined modification criteria.

17. The system of claim 9, wherein the determined fluid temperature data indicates the hot water system has been without power for at least a predefined amount of time; and
   the modified time-temperature profile configured to cause the next pasteurization cycle to occur upon power up of the hot water system.

* * * * *